(12) United States Patent
Hattori

(10) Patent No.: US 6,682,769 B2
(45) Date of Patent: Jan. 27, 2004

(54) NOODLE LOOSENING PROMOTER AND METHOD FOR ITS PRODUCTION

(75) Inventor: Mitsuo Hattori, Izumisano (JP)

(73) Assignee: Fuji Oil Co., Ltd., Osaka (JP)

( * ) Notice: Subject to any disclaimer, the term of this patent is extended or adjusted under 35 U.S.C. 154(b) by 0 days.

(21) Appl. No.: 09/756,154

(22) Filed: Jan. 8, 2001

(65) Prior Publication Data

US 2001/0024668 A1 Sep. 27, 2001

(30) Foreign Application Priority Data

Feb. 29, 2000 (JP) ........................................ 2000-054735

(51) Int. Cl.⁷ .................................................. A23J 3/16
(52) U.S. Cl. ........................ 426/656; 426/451; 426/557; 426/653
(58) Field of Search ................................. 426/557, 451, 426/656, 653, 302

(56) References Cited

U.S. PATENT DOCUMENTS 5,274,079 A * 12/1993 Katayama et al. .......... 426/656
5,543,168 A * 8/1996 Yamasaki et al. ........... 426/557
5,645,880 A * 7/1997 McArdle ..................... 426/237
5,932,272 A * 8/1999 Raemy et al. ............... 426/573
6,224,931 B1 * 5/2001 Narimatsu et al. .......... 426/451
6,284,292 B1 * 9/2001 Nielsen et al. ................ 426/46

FOREIGN PATENT DOCUMENTS

| JP | B 57-8705 | 2/1982 |
| JP | A 6-121647 | 5/1994 |
| JP | A 10-215802 | 8/1998 |

* cited by examiner

Primary Examiner—Lien Tran
(74) Attorney, Agent, or Firm—Paul & Paul

(57) ABSTRACT

A noodle loosening promoter comprising a water-soluble polysaccharide and a protein enzymolysis product as active ingredients, and a method of producing a noodle loosening promoter in which, during extraction of a water-soluble polysaccharide, the water-soluble polysaccharide extract is treated with a protease for enzymolysis of the proteins contained in the extract, in order to mix the protein enzymolysis product with the water-soluble polysaccharide.

4 Claims, No Drawings

NOODLE LOOSENING PROMOTER AND METHOD FOR ITS PRODUCTION

BACKGROUND OF THE INVENTION

1. Field of the Invention

The present invention relates to a noodle loosening promoter and a method for its production, as well as to a method for promoting loosening of noodles. The term "noodles" will be used throughout in a wide sense to include pastas, Japanese noodles, Chinese noodles and the like.

2. Description of the Related Art

Boiled noodles, steamed noodles and LL noodles are marketed in a great variety of forms through heating steps such as boiling or steaming for pregelatinization, and they are usually not consumed immediately after cooking but are first stored and then eaten upon pouring broth over them or after further cooking. Of the vast majority of these various product forms, however, noodle strands that are pregelatinized and gelatinized tend to bind tightly together as time passes, such that the noodles fail to loosen during the recooking procedure which involves removal from the package wrapping, heating, etc. for their consumption, thus creating problems such as eating difficulty, loss of taste and flavor, poor outer appearance, etc.

Methods have existed in the prior art that are intended to solve these problems, such as methods of spraying with or immersion in edible oils and fats, emulsifiers and water-soluble polysaccharides. By applying methods using edible oils or fats (such as Japanese Examined Patent Publication No. 57-8705) which utilize the mutually immiscible nature of oil and water, it is possible to promote the loosening of noodles to a slight extent, but large amounts of the oils and fats are necessary in order to completely inhibit cohesion of the noodle strands and obtain a satisfactory loosened state, and this has resulted in an oily condition and a loss of taste and pleasant feel in the mouth, while the oils and fats also float on the soup or broth and are oxidized, producing a dull color on the noodles. With time, the oils also permeate into the noodles and gradually reduce the intended loosening effect on the noodle surfaces.

With methods using emulsifiers (such as Japanese Unexamined Patent Publication No. 10-215802) it is possible to exhibit a loosening effect with smaller addition amounts than with oils and fats, since emulsifiers have better water dispersion properties, but a resulting problem is that the undesirable flavors of the emulsifiers remain until the noodles are finally consumed.

Methods using water-soluble polysaccharides (such as Japanese Unexamined Patent Publication No. 6-121647) can also exhibit a loosening effect with smaller addition amounts than with oils and fats due to higher water-solubility, while the effect on flavor is also minimal; these are currently considered to be the most suitable as noodle loosening promoters, but they still give unsatisfactory results compared to the loosened feel of freshly prepared noodles.

BRIEF SUMMARY OF THE INVENTION

It is an object of the present invention to provide noodle loosening promoters with a more notable effect compared to methods of the prior art, to a method for their production and to a method of promoting loosening of noodles.

In the course of conducting diligent research on the subject described above, the present inventors have discovered, quite by accident, that it is possible to achieve a vast improvement in the loosening property of noodles by combining water-soluble polysaccharides with enzymolysis products of proteins. The present invention has been completed on the basis of this discovery.

Specifically, the invention provides a noodle loosening promoter comprising a water-soluble polysaccharide and a protein enzymolysis product as active ingredients, as well as a method for production of a noodle loosening promoter comprising mixing a protein enzymolysis product with a water-soluble polysaccharide.

BRIEF DESCRIPTION OF THE INVENTION

Water-soluble polysaccharides can be water-extracted from polysaccharide-containing raw materials, and in some cases eluted by heating under acidic or alkaline conditions. They can also be eluted by decomposition with certain enzymes.

Specifically, the polysaccharide-containing raw materials that may be used include plant materials, such as husks of oily seeds of, for example soybean, palm, coconut, corn, cottonseed, etc. with the oil and protein removed, or the bran or refuse of grains, for example rice or wheat, or beets, from which the starch and sugars have been removed.

A water-soluble polysaccharide of the invention is preferably derived from beans, particularly soybeans, and preferably from the cotyledon thereof, and okara (bean-curd refuse), a by-product from preparation of tofu (bean curd) and soybean milk or separated soybean protein may be used.

The following is an example of a method of producing water-soluble polysaccharides. Specifically, the starting materials may be subjected to thermolytic treatment at a temperature preferably of from 80° C. to 130° C., and more preferably from 100° C. to 130° C., under either acidic or alkaline conditions but preferably at a pH near the isoelectric point of each protein, and after separation of the water-soluble fraction, it may be dried directly or preferably subjected to activated carbon treatment, resin adsorption treatment or ethanol precipitation to remove the hydrophobic substances or low molecular substances, and then dried to yield the desired water-soluble polysaccharides.

Water-soluble polysaccharides of any molecular weight may be used, but those with an average molecular weight of a few ten thousand to a few million, and especially from 50,000 to one million, are preferred.

A water-soluble polysaccharide used for the invention may also be gum arabic, tragacanth gum, carrageenan, xanthan gum, guar gum, guar gum enzymolysate, pectin, pullulan, gelan gum, locust bean gum, any of various starches or processed starches including soluble starches, or their hydrolysates.

The protein used as the starting material for the protein enzymolysis product may be plant-derived such as soybean or wheat or animal-derived such as egg white or milk, and any of these may be used alone or in combinations. Soybean is particularly preferred as a starting material because it contains abundant water-soluble polysaccharides and proteins.

Protein decomposing enzymes which may be used include proteases such as proteinases and peptidases, and specifically either endo or exo types such as pepsin, trypsin, papain, subtilisin, bromelain, etc., either alone or in combinations. The proteins are decomposed by using these enzymes under their respective optimum conditions (of temperature, pH and time), and proteins of high molecular weight are preferably digested by the enzymolysis to the level of peptides or amino acids.

Production of a noodle loosening promoter according to the invention requires mixture of the protein enzymolysis product with the water-soluble polysaccharide, and because protein is included in the crude polysaccharide extract obtained by production of the water-soluble polysaccharide, the mixing method may simply involve allowing the protease to act on the crude extract to obtain the active ingredient as a highly efficient noodle loosening promoter. Commercially available peptides or amino acids may, of course, be added and mixed with the water-soluble polysaccharide to produce the noodle loosening promoter.

The noodle loosening promoter of the invention exhibits an excellent noodle loosening effect with only the water-soluble polysaccharide and protein enzymolysis product as active ingredients, but enhanced manageability, storage properties and appearance for practical use can be achieved by combination with various water-soluble polymers that are suitable for use in existing food products, as well as sugars, sugar alcohols, fats and oils, emulsifiers, dispersing agents, acids, salts, perfumes and a variety of extracts.

As water-soluble polymers that are suitable for use in existing food products there may be mentioned, in addition to gum arabic, tragacanth gum, carrageenan, xanthan gum, guar gum, guar gum enzymolysate, pectin, pullulan, gelan gum, locust bean gum, and any of various starches or processed starches including soluble starches or their hydrolysates as mentioned above, also gelatin, casein sodium, angelica gum, gloiopeltis glue, agar, furcellaran, tamarind seed polysaccharides, karaya gum, hibiscus, sodium alginate, propyleneglycol alginate, hyaluronic acid, dextrin, cyclodextrin, chitosan, whey and other albumins, soluble collagen, egg white, egg yolk powder, soybean protein and other proteinaceous substances or their decomposition products, carboxymethyl cellulose (CMC) and methyl cellulose (MC), any of which may be used alone or in combinations of two or more to allow adjustment of the viscosity and glutinosity for enhanced manageability, or to facilitate uniform coating of the noodle surfaces for an even greater effect.

As examples of sugars and sugar alcohols there may be mentioned sucrose, maltose, maltitol, erythritol, trehalose, sorbitol and reduced starch sugar products, and as examples of fats and oily substances there may be mentioned common animal and vegetable oils and the oil-soluble vitamin tocopherol, etc.

Conventional emulsifiers may be used as emulsifiers for the invention, and examples thereof include nonionic surfactants such as sorbitan fatty acid ester, glycerin fatty acid ester, polyglycerin fatty acid ester, sugar esters and the like; anionic surfactants, typical of which are alkylbenzene sulfonates and higher alcohol sulfuric acid ester salts; cationic surfactants such as quaternary ammonium salts; and amphoteric surfactants such as lecithin. As dispersing agents there may be mentioned sodium metaphosphate and the like.

As acids there may be mentioned organic acids such as acetic acid, lactic acid and citric acid and inorganic acids such as phosphoric acid, and as salts there may be mentioned organic acid salts such as sodium acetate, sodium lactate and sodium citrate, as well as common salt.

Any perfume commonly used for consumption of noodles may be added together with the loosening agent to improve the yield by perfuming the surfaces of the noodles. Various extracts may also be mentioned such as malt extract or polylysine, which have an enhancing effect on the shelf-life, and wheat extract which can impart a suitable fragrance for consumption of noodles in the same manner as a perfume.

The proportion of the water-soluble polysaccharide to the protein enzymolysis product may be 99–1:1–99, and preferably 98–2:2–98 in terms of the dry weight of both, and a sufficient effect can be achieved in practice with a proportion of 97–80 for the water-soluble polysaccharide and 3–20 for the protein enzymolysis product.

The noodle loosening promoter of the invention is preferably in liquid form from the standpoint of manageability, but it may also be in powder form or in granulated form to improve the powder solubility. For actual use, a liquid product may be used directly or at an appropriate degree of dilution, and in the case of a dry product such as a powder, it may be used after dissolving at an appropriate concentration.

The reason for the excellent loosening effect exhibited by the noodle loosening promoter of the invention is not fully understood, but the loosening property of noodles normally attributed to water-soluble polysaccharides is believed to be connected with the function of preventing association between substances, similar to the dispersing properties of fine particles in aqueous solutions. On the other hand, protein enzymolysis products are amphoteric compounds such as peptides and amino acids, and are believed to inhibit thickening of starches which elute from the noodle surfaces, thus helping to maximize the noodle loosening effect naturally produced by the water-soluble polysaccharides.

Embodiments of the invention will now be explained by way of examples which are, however, intended only as illustration and are not meant to restrict the spirit of the invention. Throughout the examples, the "parts" and "%" values are all based on weight.

○ Preparation of Soybean-derived Water-soluble Polysaccharide

To raw okara obtained from production of separated soybean protein there was added a two-fold amount of water, and after adjustment to pH 4.5 with hydrochloric acid, the mixture was hydrolyzed at 120° C. for 1.5 hours. After cooling, the mixture was centrifuged (10,000 G×30 minutes) and the supernatant and precipitate portion were separated. The separated precipitate portion was washed with an equivalent weight of water and centrifuged to obtain a supernatant as a crude extract of the water-soluble polysaccharide. The supernatant was adjusted to pH 7.0, and then Protease A (product of Amano Pharmaceutical Co., Ltd.) was added as a protease at 0.02% with respect to the solution, and reaction was conducted at 40° C. for 120 minutes. The mixture was then heated at 90° C. for 15 minutes to deactivate the enzyme, and finally dried to obtain water-soluble polysaccharide (a).

Water-soluble polysaccharide (b) was obtained according to the method described above, without enzymolysis treatment but with drying in the same manner.

Water-soluble polysaccharide (b) was dissolved in 0.5% aqueous NaCl solution, reprecipitation in an ethanol concentration of 50% was repeated three times, and an ion-exchange resin ("Amberlite IR-120B", product of Organo Corp.) was used for salting out to obtain water-soluble polysaccharide (c).

The results of compositional analysis of the obtained soybean polysaccharide are summarized in Table 1 below.

TABLE 1

| Soybean polysaccharide composition (wt %) | | | |
| --- | --- | --- | --- |
| Component | (a) | (b) | (c) |
| Water | 6.32 | 5.20 | 5.14 |
| Crude protein | 6.48 | 5.94 | 2.12 |
| Crude ash | 6.38 | 5.47 | 1.45 |
| Polysaccharide | 80.82 | 83.39 | 91.29 |

Example 1

○ Preparation of Liquid Noodle Loosening Promoter

Five parts of water-soluble polysaccharide (a) was dissolved in 95 parts of water to obtain a liquid noodle loosening promoter.

Example 2

Five parts of water-soluble polysaccharide (b) and 1 part of the soybean peptide Hinute DL (product of Fuji Oil Co., Ltd.) as a protein enzymolysis product were dissolved in 94 parts of water to obtain a liquid noodle loosening promoter.

Example 3

A liquid noodle loosening promoter was obtained in exactly the same manner as Example 2, except that water-soluble polysaccharide (c) was used instead of water-soluble polysaccharide (b) used in Example 2.

Example 4

A liquid noodle loosening promoter was obtained in exactly the same manner as Example 2, except that gum arabic was used instead of water-soluble polysaccharide (b) used in Example 2.

Comparative Example 1

A liquid noodle loosening promoter was obtained in exactly the same manner as Example 1, except that water-soluble polysaccharide (b) was used instead of water-soluble polysaccharide (a) used in Example 1.

Comparative Example 2

A liquid noodle loosening promoter was obtained in exactly the same manner as Example 1, except that water-soluble polysaccharide (c) was used instead of water-soluble polysaccharide (a) used in Example 1.

Comparative Example 3

A liquid noodle loosening promoter was obtained in exactly the same manner as Example 1, except that gum arabic was used instead of water-soluble polysaccharide (a) used in Example 1.

Comparative Example 4

A liquid noodle loosening promoter was obtained in exactly the same manner as Example 1, except that the soybean peptide Hinute DL was used instead of water-soluble polysaccharide (a) used in Example 1.

○ Evaluation of Loosening Promoting Effect

Udon, or Japanese wheat noodles (frozen "Sanuki udon", product of Katokichi Co., Ltd.), were placed in hot water and brought to a boil and then cooled with running water, and after draining with a colander, they were placed in hexagonal containers at 200 g portions each. Finally, 2 g of the liquid noodle loosening promoters obtained in Examples 1 to 4 and Comparative Examples 1 to 4 or water was sprayed onto the noodles using a sprayer.

Japanese soba, or buckwheat noodles (Tororo noodles, 230 g noodle weight, product of Seven-Eleven Japan Co., Ltd.) were removed from the package, and then the top cover was taken off and 2.3 g of the liquid noodle loosening promoters obtained in Examples 1 to 4 and Comparative Examples 1 to 4 or water was sprayed onto the noodles using a sprayer.

Chinese noodles (cold Chinese noodles, 270 g noodle weight, product of Seven-Eleven Japan Co., Ltd.) were removed from the package, transferred to a colander and then immersed in a bowl containing 2 liters of the liquid noodle loosening promoters obtained in Examples 1 to 4 and Comparative Examples 1 to 4, soybean oil (white soybean oil, product of Fuji Oil Co., Ltd.) or water for a period of 10 seconds while gently shaking, and after draining for 5 minutes they were returned to the original container.

After boiling spaghetti (commercially available dry pasta, product of Nisshin Flour Milling Co., Ltd.) for a prescribed time period, it was drained with a colander, divided into 200 g portions and returned to the colander, and then immersed without stirring for a period of 20 seconds in a bowl containing 2 L of the liquid noodle loosening promoters obtained in Examples 1 to 4 and Comparative Example 1 to 4 or water which had been heated to 10° C., and after draining for 2 minutes they were placed in a hexagonal container.

After boiling somen (Japanese vermicelli) (commercially available dry noodles, product of Miwa Somen Yamamoto Co., Ltd.) for a prescribed time period, they were cooled with running water, drained with a colander, divided into 50 g portions and returned to the colander, and then immersed without stirring for a period of 20 seconds in a bowl containing 2 L of the liquid noodle loosening promoters obtained in Examples 1 to 4 and Comparative Example 1 to 4 or water which had been heated to 10° C., and after draining for 2 minutes they were placed in a sealed container.

The noodles on which the loosening promoters or water had been sprayed were closed with a cover and then stored in a still place at 10° C. for 24 hours and 48 hours. After the end of this storage period, the covers were opened, 4 or 5 strands at the center were lifted up with chopsticks, and the loosened condition was observed. Broth adjusted to 10° C. was poured thereover, and after 5 seconds the loosened condition was again observed. In another evaluation after 24 hours of still storage and without pouring broth, the feel in the mouth of the upper surface and base of a wound noodle ball was also examined.

The loosened condition was evaluated on the following 4-level scale.

The noodles taken with the chopsticks separated cleanly from the noodle ball: 3 points The noodles separated from each other, but the entire noodle ball lifted with them: 2 points The entire noodle ball lifted in a clump: 1 point The noodle ball lifted without separating from the container, or the noodles abruptly tore: 0 points The feel in the mouth of the noodles was evaluated on the following 2-level scale.

Equivalent to the water-sprayed product: ○

Softer (mushier) than the water-sprayed product: X

The results are shown together in Tables 2 to 6.

TABLE 2

Udon (Japanese wheat noodles)

| Still storage time | 24 hours | | 48 hours | | Feel in the mouth | |
|---|---|---|---|---|---|---|
| Evaluation | No broth | Broth | No broth | Broth | Upper surface | Base |
| Example 1 | 3 | 3 | 3 | 3 | ○ | ○ |
| Example 2 | 3 | 3 | 2 | 3 | ○ | ○ |
| Example 3 | 3 | 3 | 3 | 3 | ○ | ○ |
| Example 4 | 2 | 3 | 2 | 3 | ○ | ○ |
| Comp. Ex. 1 | 2 | 3 | 1 | 2 | X | ○ |
| Comp. Ex. 2 | 1 | 2 | 1 | 2 | ○ | ○ |
| Comp. Ex. 3 | 1 | 2 | 1 | 2 | X | X |
| Comp. Ex. 4 | 0 | 2 | 0 | 1 | X | X |
| Water | 0 | 1 | 0 | 1 | — | — |

TABLE 3

Japanese soba (buckwheat noodles)

| Still storage time | 24 hours | | 48 hours | | Feel in the mouth | |
|---|---|---|---|---|---|---|
| Evaluation | No broth | Broth | No broth | Broth | Upper surface | Base |
| Example 1 | 3 | 3 | 3 | 3 | ○ | ○ |
| Example 2 | 3 | 3 | 3 | 3 | ○ | ○ |
| Example 3 | 3 | 3 | 3 | 3 | ○ | ○ |
| Example 4 | 2 | 3 | 2 | 3 | ○ | ○ |
| Comp. Ex. 1 | 2 | 3 | 2 | 2 | ○ | ○ |
| Comp. Ex. 2 | 2 | 3 | 2 | 2 | ○ | ○ |
| Comp. Ex. 3 | 2 | 2 | 2 | 2 | X | X |
| Comp. Ex. 4 | 0 | 2 | 0 | 1 | X | X |
| Water | 0 | 1 | 0 | 1 | — | — |

TABLE 4

Chinese noodles

| Still storage time | 24 hours | | 48 hours | | Feel in the mouth | |
|---|---|---|---|---|---|---|
| Evaluation | No broth | Broth | No broth | Broth | Upper surface | Base |
| Example 1 | 3 | 3 | 3 | 3 | ○ | ○ |
| Example 2 | 3 | 3 | 2 | 3 | ○ | ○ |
| Example 3 | 3 | 3 | 3 | 3 | ○ | ○ |
| Example 4 | 2 | 3 | 2 | 2 | ○ | ○ |
| Comp. Ex. 1 | 2 | 3 | 1 | 2 | ○ | ○ |
| Comp. Ex. 2 | 2 | 2 | 1 | 1 | ○ | ○ |
| Comp. Ex. 3 | 1 | 1 | 1 | 1 | ○ | X |
| Comp. Ex. 4 | 1 | 1 | 1 | 1 | X | X |
| Soybean oil | 3 | 3 | 2 | 2 | X | X |
| Water | 0 | 1 | 0 | 1 | — | — |

TABLE 5

Spaghetti

| Still storage time | 24 hours | | 48 hours | | Feel in the mouth | |
|---|---|---|---|---|---|---|
| Evaluation | No broth | Broth | No broth | Broth | Upper surface | Base |
| Example 1 | 3 | 3 | 3 | 3 | ○ | ○ |
| Example 2 | 3 | 3 | 3 | 3 | ○ | ○ |
| Example 3 | 3 | 3 | 3 | 3 | ○ | ○ |
| Example 4 | 3 | 3 | 3 | 3 | ○ | ○ |
| Comp. Ex. 1 | 3 | 3 | 2 | 3 | ○ | ○ |
| Comp. Ex. 2 | 3 | 3 | 2 | 3 | ○ | ○ |
| Comp. Ex. 3 | 2 | 2 | 1 | 2 | ○ | X |
| Comp. Ex. 4 | 1 | 1 | 1 | 1 | X | X |
| Water | 0 | 1 | 0 | 1 | — | — |

TABLE 6

Somen (Japanese vermicelli)

| Still storage time | 24 hours | | 48 hours | | Feel in the mouth | |
|---|---|---|---|---|---|---|
| Evaluation | No broth | Broth | No broth | Broth | Upper surface | Base |
| Example 1 | 3 | 3 | 2 | 3 | ○ | ○ |
| Example 2 | 2 | 3 | 2 | 3 | ○ | ○ |
| Example 3 | 3 | 3 | 2 | 3 | ○ | ○ |
| Example 4 | 2 | 3 | 2 | 2 | ○ | ○ |
| Comp. Ex. 1 | 1 | 3 | 1 | 2 | ○ | ○ |
| Comp. Ex. 2 | 1 | 3 | 1 | 2 | ○ | X |
| Comp. Ex. 3 | 1 | 1 | 1 | 1 | ○ | X |
| Comp. Ex. 4 | 1 | 1 | 1 | 1 | X | X |
| Water | 0 | 1 | 0 | 1 | — | — |

As shown above, when water-soluble polysaccharides were combined with protein enzymolysis products, a more excellent noodle loosening effect was obtained than when using only the water-soluble polysaccharides alone. On the other hand, using only the protein enzymolysis products alone produced no satisfactory loosening effect, and when used in large amounts there was instead a tendency toward a mushier feel in the mouth.

Thus, using water-soluble polysaccharides in combination with protein enzymolysis products gives an excellent noodle loosening effect. It is thereby possible to provide cold Chinese noodles, cold udon, zaru-soba (buckwheat noodles on a bamboo plate), cold spaghetti, somen and the like which maintain their freshly prepared flavor even after storage after cooking and then recooking, without any effect on the feel in the mouth or taste, so that an improvement in product value is also provided.

We claim:

1. A method of producing a noodle loosening promoter comprising obtaining a water-soluble polysaccharide extract from soybean okara, said extract containing protein, treating said extract with a protease for a time and at a temperature sufficient to cause enzymolysis of the proteins contained in the extract, deactivating the protease by heating to obtain the noodle loosening promoter comprising said water soluble polysaccharide extract and protein enzymolysis product.

2. A method according to claim 1 wherein the protein enzymolysis product is a peptide or amino acid.

3. A method of promoting loosening of noodles, wherein a promoter obtained by the method according to claim 1 is used.

4. A method of producing easily loosening noodles, wherein a promoter obtained by the method according to claim 1 is used.

\* \* \* \* \*